(12) United States Patent
D'Angelo et al.

(10) Patent No.: US 7,786,686 B2
(45) Date of Patent: Aug. 31, 2010

(54) METHOD AND DEVICE FOR ESTIMATING THE ANGULAR POSITION OF THE ROTOR OF A BRUSHLESS MOTOR

(75) Inventors: Giuseppe D'Angelo, Casalnuovo di Napoli (IT); Giovanni Moselli, S. Arpino (IT); Stefano Baratto, Napoli (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 351 days.

(21) Appl. No.: 12/017,845

(22) Filed: Jan. 22, 2008

(65) Prior Publication Data

US 2008/0180046 A1  Jul. 31, 2008

(30) Foreign Application Priority Data

Jan. 23, 2007 (IT) .......................... VA2007A0012

(51) Int. Cl.
*H02P 6/00* (2006.01)
*H02P 6/16* (2006.01)
(52) U.S. Cl. ............................ 318/400.01; 318/400.08; 318/801; 702/64
(58) Field of Classification Search ................. 318/800, 318/801, 811, 432–434, 400.01, 400.02, 318/400.13, 400.38, 400.39, 599; 324/521, 324/522, 713, 177, 76.39, 76.77; 363/40, 363/78, 74; 702/64
See application file for complete search history.

(56) References Cited

U.S. PATENT DOCUMENTS

| | | | | |
|---|---|---|---|---|
| 5,461,293 A | * | 10/1995 | Rozman et al. | 318/603 |
| 5,767,639 A | * | 6/1998 | Sakaguchi et al. | 318/400.11 |
| 6,091,170 A | * | 7/2000 | Mayes et al. | 310/68 B |
| 6,229,231 B1 | * | 5/2001 | Ishida et al. | 310/36 |
| 7,482,802 B2 | * | 1/2009 | Finkler et al. | 324/207.25 |
| 2007/0101956 A1 | * | 5/2007 | Schafer et al. | 123/90.15 |
| 2007/0241741 A1 | * | 10/2007 | Pirozzi et al. | 324/160 |
| 2009/0240389 A1 | * | 9/2009 | Nomura et al. | 701/29 |

* cited by examiner

*Primary Examiner*—Walter Benson
*Assistant Examiner*—Eduardo Colon-Santana
(74) *Attorney, Agent, or Firm*—Lisa K. Jorgenson; Allen, Dyer, Doppelt, Milbrath & Gilchrist, P.A.

(57) ABSTRACT

A method is for estimating an angular position of a rotor of a motor having position sensors along the circumference of a stator and generating digital signals that switch each time the rotor crosses certain angular positions. The method includes storing rotor angular positions at every digital signal switching, and determining for each rotor revolution a time interval elapsed between a current and a precedent switching edge of the signal generated. The method also includes estimating the angular position during a current rotor revolution by identifying which position sensor generated the last detected switching edge. The corresponding angular position and the time interval elapsed between two consecutive rotor crossings, through a same angular position, correspond to a sum between the angular position and a product between a fraction of the time interval elapsed from the corresponding precedent switching edge multiplied by 360° and a number of polar pairs.

9 Claims, 5 Drawing Sheets

METHOD AND DEVICE FOR ESTIMATING THE ANGULAR POSITION OF THE ROTOR OF A BRUSHLESS MOTOR

FIELD OF THE INVENTION

This invention relates to the control of brushless motors, and, more particularly, to a method and a device for estimating the angular position in electrical degrees of the rotor of a brushless motor having position sensors disposed along the circumference of the stator.

BACKGROUND OF THE INVENTION

Generally, electrical actuators are controlled using signals generated by position sensors. For controlling permanent magnets of electric motors, low resolution sensors, such as Hall sensors, are commonly used for containing costs. These devices, positioned on the stator, sense the rotor magnetic field and generate a voltage signal proportional to the intensity of the magnetic field, as depicted in FIG. 1.

The intensity of the magnetic field decreases when the distance of magnetic poles from the Hall sensor, indicated in FIG. 1 by an arrow, increases, and, thus, the voltage generated by the sensor decreases. The period of the voltage signal generated by the Hall sensor for a mechanical revolution of the rotor depends on the number of polar pairs of the motor. Thus the mechanical resolution of the single sensor increases when the number of polar pairs of the motor itself increases, but the resolution in electrical degrees remains unchanged.

The signal generated by the Hall sensor is analog. Nevertheless, if this signal drives an hysteretic threshold detector, for example, a Schmitt's trigger, the output signal is an ON/OFF type, that is a digital signal is obtained in which information about the position of the rotor is given by leading and trailing edges.

Generally, an electric motor is equipped with three Hall sensors spaced at a distance of 120° one from the other. FIG. 2, for example, depicts a sample sequence of the switching edges generated by the three Hall sensors installed on a Pittman motor 3441S001-R3, and the respective value of the electrical angle. As shown in the figure, a leading or a trailing edge occurs at every 60 electrical degrees.

By way of example, hereinafter reference will be made to this resolution, even if in general it is insufficient for actuating complex control strategies to improve performances of the control system both in terms of ripple of the motor torque, or in terms of Total Harmonic Distortion (or more briefly THD) of the phase currents of the motor.

If the angular position of the rotor is known in correspondence of each switching edge, there is the problem of estimating the angular position between two consecutive edges. The classic method for reconstructing the angular position of the rotor contemplates a linear interpolation operation as a function of the time t elapsed from the last edge and the time $t_0$ elapsed from the last edge and the previous edge, considering that $t_0$ is the time required for rotating of 60 electrical degrees. Accordingly, the angle θ in electrical degrees at the instant t is:

$$\theta(t) = \frac{t}{t_0} \cdot 60 + \theta_0 \quad (1)$$

wherein $\theta_0$ is the angle in electrical degrees associated to the last detected switching edge (FIG. 2). This is equivalent to assuming the rotation speed is constant.

The precision of the estimation of the angular speed of the rotor depends on the validity of the hypothesis of constant speed for calculating the current angular position using the time $t_0$ and on the precision of the Hall sensors. Tests carried out on commercial motors using simple algorithms for calculating the angular position, based on the above mentioned hypothesis, demonstrated that the uncertainty of information provided by Hall sensors implies a significant imprecision of the estimated angular position of the rotor, with a consequent increase of the THD of the phase currents of the motor. Imprecision is essentially due to fabrication limitations of the sensors, imprecise mounting of the sensors, and distortion of the rotor magnetic field.

As far as fabrication limitations are concerned, the amplitude of the hysteresis bandwidth of the threshold detector may lead to systematic errors in aligning the edges of the output signals of the sensor with the respective theoretical angle. Moreover, the sensor provides a signal proportional to the intensity of the sole orthogonal component of the magnetic flux with respect to its own surface. Thus positioning errors of the sensor, such as, for example, a lateral shift or rotation with respect to the vertical axis, generate alignment errors of the edges of the output signal of the sensor with the respective theoretical angle. Moreover, in the latter case, alignment errors differ depending on whether a leading or a trailing edge has been detected. Distortions of the rotor magnetic field may be caused by irregularities of the magnetization of the permanent magnets, fabrication eccentricity, and by the so-called armature reaction, that is by the magnetic field due to current flowing through phase windings of the stator. Therefore a system for estimating the angular position of the rotor of a motor that would allow reduction of errors due to the imprecision of the information provided by Hall sensors would be desirable. Such a system could enhance performances of the control system in terms of motor torque ripple and in terms of THD of the phase currents.

SUMMARY OF THE INVENTION

A method and a respective hardware device for estimating the angular position of the rotor of a brushless motor with enhanced precision in respect to the known techniques has been found.

The proposed method may overcome the drawbacks of the known methods because the accuracy of the estimations does not depend on the accuracy with which the position sensors are distributed along the circumference of the rotor, nor is it influenced by the hysteresis of the threshold detectors that converts the signals generated by the Hall sensors in digital ON/OFF signals. As a consequence, it may be possible to obtain accurate estimations of the rotor position even using relatively inaccurate sensors and/or sensors not uniformly distributed along the stator circumference.

When the rotor rotates at a constant speed, the time elapsed between two consecutive edges of the logic signal generated by any of the sensors when passing through a pre-established position, may not depend on how the sensors are disposed along the rotor circumference, and it may not be substantially influenced by the hysteresis of threshold detectors. Indeed, measures of a revolution period of the rotor may not be affected by systematic errors due to non-uniform mutual spacing of the sensors, because the rotation mechanical angle is 360° and the errors introduced by hysteresis phenomena compensate themselves in a revolution. The method may be implemented also through software executed by a computer or microprocessor.

DETAILED DESCRIPTION OF THE PREFERRED EMBODIMENTS

Figures 1, 2:
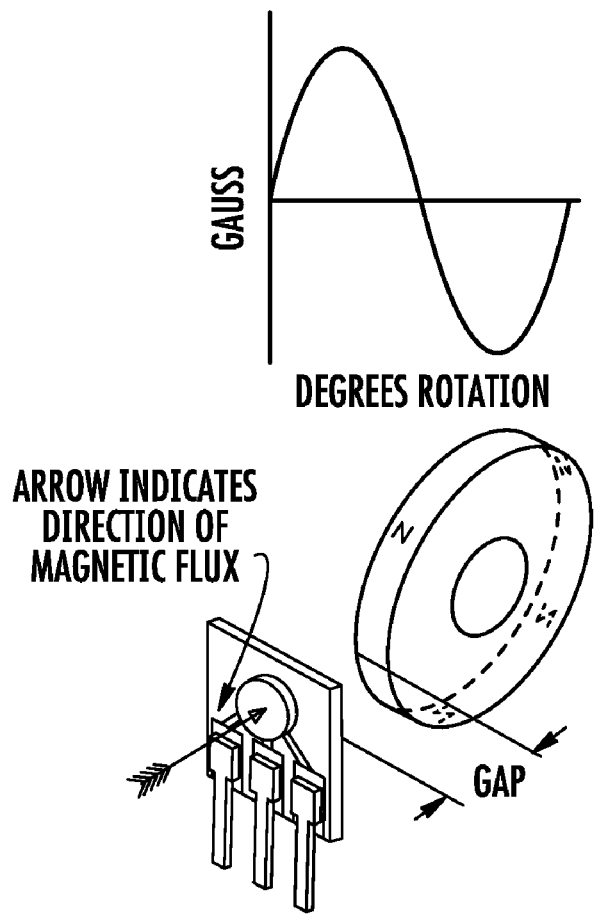
FIG. 1 illustrates the functioning of Hall sensors as in the prior art.
FIG. 2 depicts graphs of digital signals generated by three Hall sensors distributed along the circumference of the rotor of a brushless motor as in the prior art.
Figure 3:
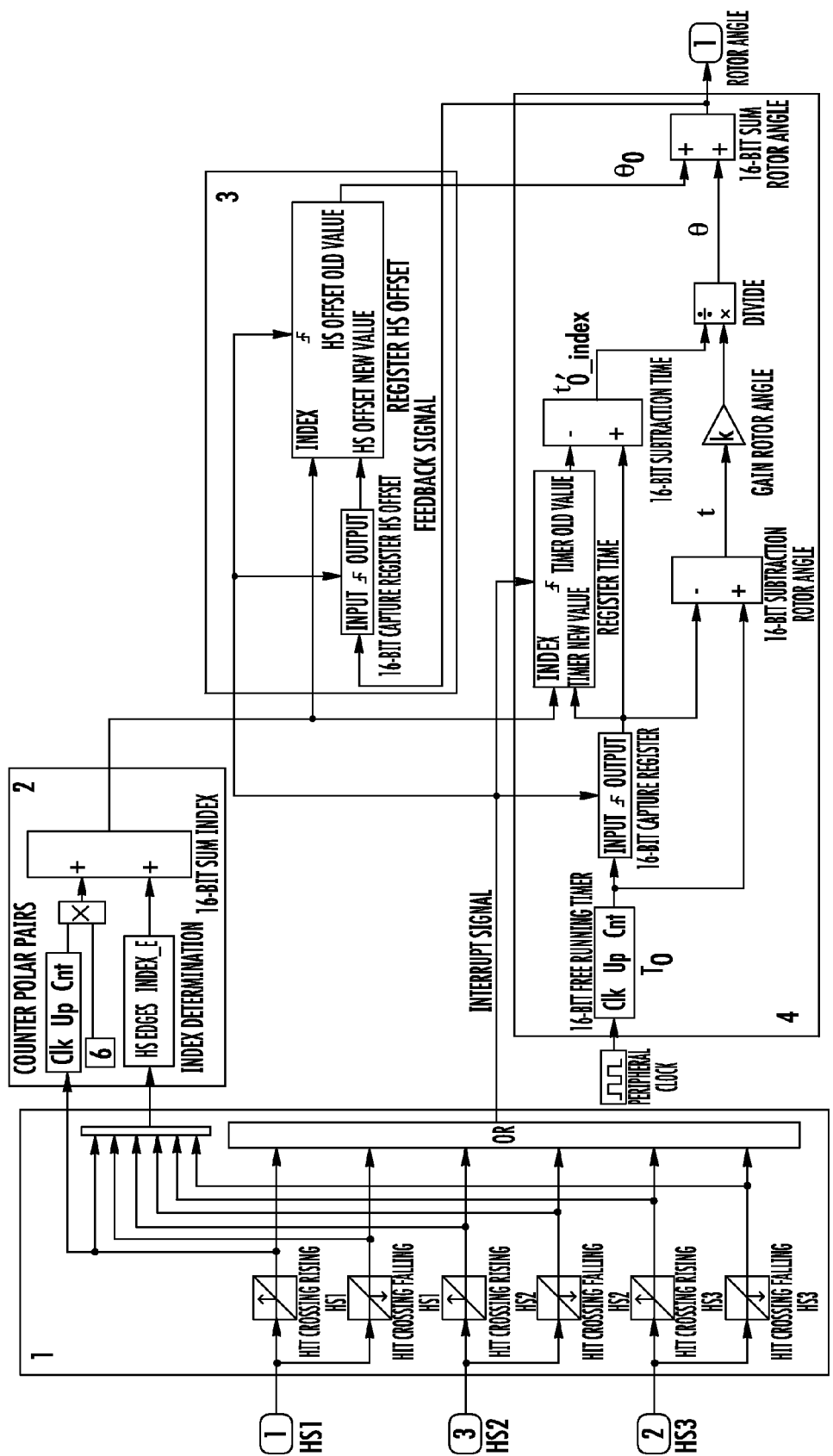
FIG. 3 depicts a preferred embodiment of the device of this invention.

The architecture of a preferred embodiment of a device that implements the method of this invention is depicted in FIG. 3. Reference is made to the most common case in which three Hall sensors are installed on the motor. The considerations that will be made apply with the respective differences having been considered, whatever the number of sensors mounted on the stator is.

Circuit 1

Circuit 1 includes six hit crossing blocks, each generating a pulse in correspondence with a leading or trailing edge of the respective sensor, and by a logic OR block. Circuit 1 generates a general synchronization signal (used as enabling signal by systems 3 and 4) output by the OR block and six synchronization signals (used by circuit 2) that allow discrimination of the type of edges generated by Hall sensors on an electrical revolution (leading or trailing edge and the sensor that generated it).

Circuit 2

Circuit 2 determines the value, of the index that will be used by circuits 3 and 4, that identifies the last detected edge. Circuit 2 includes the block INDEX DETERMINATION, of the block COUNTER POLAR PAIRS, of a counter modulo n−1 with n number of polar pair of the motor, and by a multiplier of 6.

The block INDEX DETERMINATION is input with six synchronization signals generated by circuit 1 and outputs the value index_e between 1 and 6, depending on which of the six synchronization signals produced a pulse. The clock input of the counter modulo n−1 is the synchronization signal relative to the leading edge of the Hall sensor 1 that is used as reference for determining the present polar pair. The output of the counter is between 0 and n−1. Thus, it is multiplied by 6 and summed to the term index_e. The value of the term index output by the circuit 2 will be between 1 and 6*n, wherein n is the number of the polar pair of the motor. In the case of a motor with 2 polar pairs, the value of index will be between 1 and 12. In the simple case of a motor with two polar pairs, the counter may be substituted for a toggle flip-flop.

The value index is required because according to the method, the time $t_0$ (defined above) elapsed between two successive edges of the Hall sensors and corresponding to a constant rotation of 60 electrical degrees, is not measured anymore because of the drawbacks described above. Differently, the angular distance between two successive determinations of the same edge of the Hall sensors in a mechanical revolution of the rotor is constant and equal to 360 mechanical degrees, that is 720 electrical degrees if the motor has two polar pairs independent from the distribution of the Hall sensors on the circumference of the stator. Being $t'_0$ is the time interval elapsed between two successive occurrences of a same edge of a same Hall sensor after a mechanical revolution of the rotor, this time interval is used for estimating the current angular position of the rotor. In this case, a value $t'_0$ is determined for each of the edges of the Hall sensors and for each polar pair. It is, thus, desirable to include a register of appropriate storage capacity dedicated to store these intervals. The index with which the register is accessed for taking or updating the current value of $t'_0$ is given by the value index.

Considering that in an electrical revolution, a leading edge and a trailing edge occur for each Hall sensor. The number of time intervals $t'_0$ is 2*3*n=6*n, wherein the factor 2 is the number of (leading and trailing) edges for each electrical revolution for each Hall sensor. The factor 3 is the number of Hall sensors and n is the number of polar pairs of the motor.

At each occurrence of an edge of the Hall sensors it is desirable to determine the index associated with the event in order to determine the respective value $t'_{0\_index}$ and use it for calculating the angular position of the rotor, as far as the occurrence of a new edge. According to the method, the position is estimated with the following formula:

$$\theta(t) = \frac{t}{t'_{0\_index}} \cdot 360 \cdot n + \theta_0 \qquad (2)$$

Circuit 3 calculates the angle $\theta_0$ for each of the edges of the Hall sensors by discriminating the current polar pair. In the proposed system, circuit 3 outputs, for each of the edges of the Hall sensors, by discriminating the current polar pair, a value $\theta_0$ that depends on the angle that the system for that event calculated using the feedback signal. The value of the rotor angle calculated in the instant in which each event has occurred is stored, through the feedback signal, in the register 16-BITS CAPTURE REGISTER HS OFFSET. The register is enabled by the general synchronization signal.

The block REGISTER HS OFFSET includes a register with 6*n locations and is enabled by the general synchronization signal. This block is input with the current value of the index, outputs the correct value of $\theta_0$(index), and reads the value stored in the block 16-BIT CAPTURE REGISTER HS OFFSET in order to update the current position with the new value $\theta_0$ (index).

The block REGISTER HS OFFSET and the block 16-BIT CAPTURE REGISTER HS OFFSET are enabled in the same instant. The block Register HS offset reads the value $\theta_0$(index) stored during the previous mechanical revolution before the block 16-BIT CAPTURE REGISTER HS OFFSET updates its output with the new value. Therefore, the value of $\theta_0$ is updated with a delay of one mechanical round.

In practice, circuit 3 calculates the angle $\theta(t)$ in (6*n) synchronization instants with t equal to the instant in which an edge of the Hall sensors occur, according to equation (1), in the previous mechanical revolution. T thus the values $\theta_0$ ($t'_{0\_index}$) obtained with index*=1, 2, . . . , (6*n) and stored in REGISTER HS OFFSET. In the current mechanical revolution, circuit 4 uses these stored values and, through equation (2), calculates θ(t), t being a generic instant in which the position of the rotor in electrical degrees is to be estimated for controlling the motor.

This condition is not binding because the update could be done in the same mechanical revolution simply by eliminating the block 16-BIT CAPTURE REGISTER HS OFFSET. This sampling block has been inserted in order to show that, when a switching edge occurs, it is desirable to have a sampling register enabled via hardware that stores the current angular position of the rotor.

A value K of index is to be chosen for which the value of $\theta_0(K)$ is not calculated, but it is assumed as a reference for calculating $\theta_0$(index). In the shown sample case, the value K=0 corresponds to the angle 0°, that is to the leading edge of the Hall sensor 1, as for circuit 2. Any skilled person will readily appreciate that any value K of the index may be chosen.

Circuit 4 uses a free running 16-bit timer $T_0$ for calculating the time $t'_{0\_index}$ for each of the edges. Considering that on a mechanical revolution, in the hypothesis that the motor has two polar pairs, 12 edges of Hall sensors occur, and using the register REGISTER TIME that has 12 storage cells it is possible to calculate all times $t'_{0\_index}$ for each of the edges of the Hall sensors by also discriminating the current polar pair. The value previously assumed by the timer $T_0$ and associated to the current edge of the Hall sensors is located in the location of the register REGISTER TIME identified by the value index. The value $t'_{0\_index}$ is calculated by subtracting this previous value and the current value using the adder 16-BIT SUBTRACTION TIME. At the same time, the corresponding cell of the register is updated with the current value of the timer for the next calculation.

The timer $T_0$ is also used for calculating the value t as a difference between the current value of the timer $T_0$ and the value to which the last edge of the Hall sensors has occurred. This is done by the adder 16-BIT SUBTRACTION ROTOR ANGLE because the timer $T_0$ is used in free running mode, and it is not reset at each occurrence of edges of Hall sensors.

The value of the gain k depends on the number of polar pairs of the motor and, in the considered case, it is 720°. The angular position of the rotor $\theta_0$(t, index) at the instant t is estimated using the following equation:

$$\theta(t,\text{index}) = (t/t'_{0_{index}}) * k + \theta_0(\text{index})$$

wherein $\theta_0$ (index) is the angle associated to each of the edges of the Hall sensors identified by the value index.

After an initial transient, the device is in a steady-state condition for each of the edges of the Hall sensors and for each of the polar pairs of the real angle to which the edge corresponds. The electric angle is conveniently represented with a 16-bit string, and the maximum value of the representation corresponds to 360°. Thus, all additions and subtractions are carried out on 16-bit strings, and thus, a truncation corresponds to an operation modulo 360°.

The proposed system can be extended to 32-bit architectures using a 32-bit timer and executing all additions and subtractions on 32-bits. Moreover, the system may also be extended to motors having more than 2 polar pairs by properly choosing the module of the counter COUNTER POLAR PAIRS, the storage capacity of the registers REGISTER TIME, and REGISTER HS OFFSET, and the value of the constant k.

Experimental Results

The proposed method has been implemented on a microcontroller of the family ST10. The system for testing the method also comprises the evaluation board of the Start27x Evaluation Kit produced by FS FORTH-SYSTEME GmbH, the MP49 board and the Pittman 3441S001-R3 motor.

Figure 4:
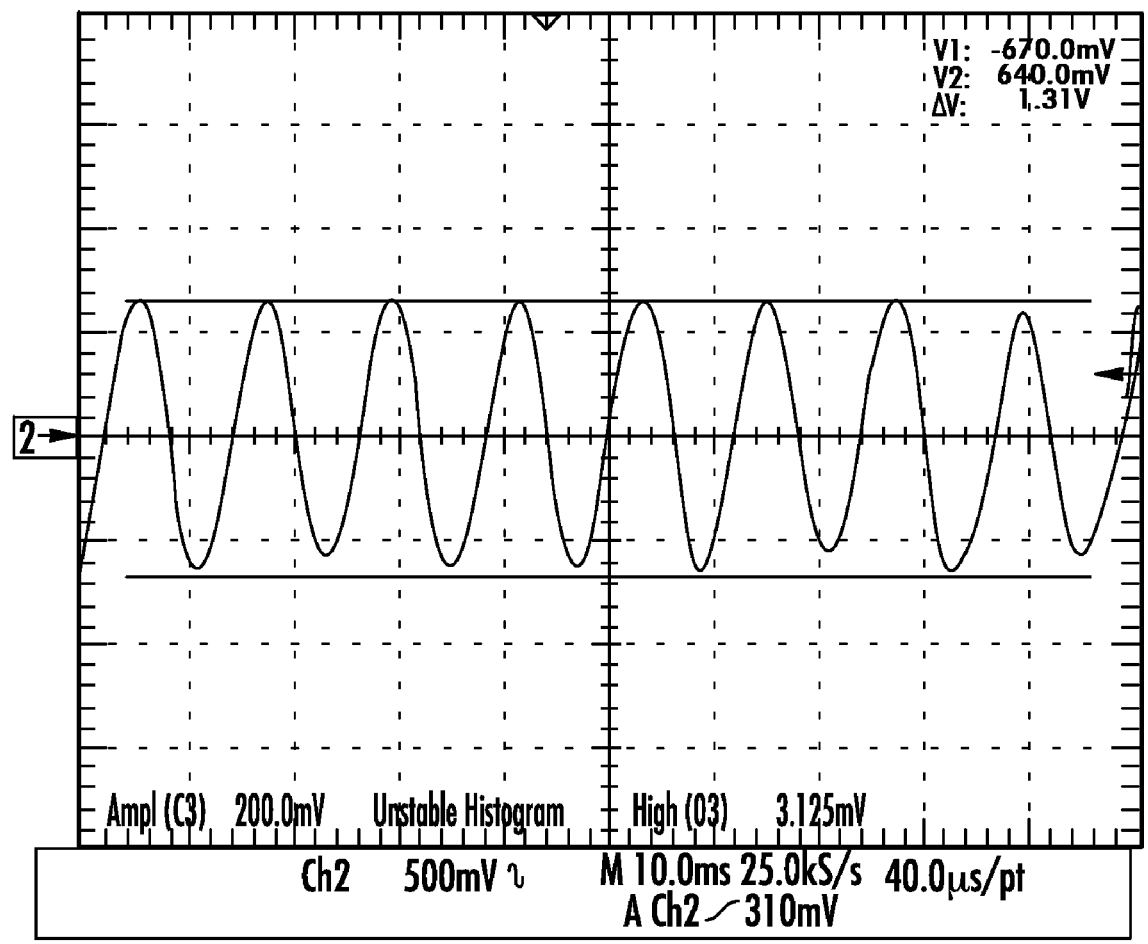
FIG. 4 is a sample graph of a phase current of a brushless motor controlled with a classic technique using equation (1) as in the prior art.

FIG. 4 depicts a waveform of a phase winding current of the motor in the case in which the evaluation of the position of the rotor is carried out through three Hall sensors using a classic strategy. The waveform of the current is evidently deformed and the error due to the difference between the real position and the theoretical position of the edges of the Hall sensors makes the current profilers asymmetric. More particularly, there is a periodic peak-to-peak difference that depends on the considered polar pair (the Pittman 3441S001-RS motor used for the test has two polar pairs).

Figure 5:
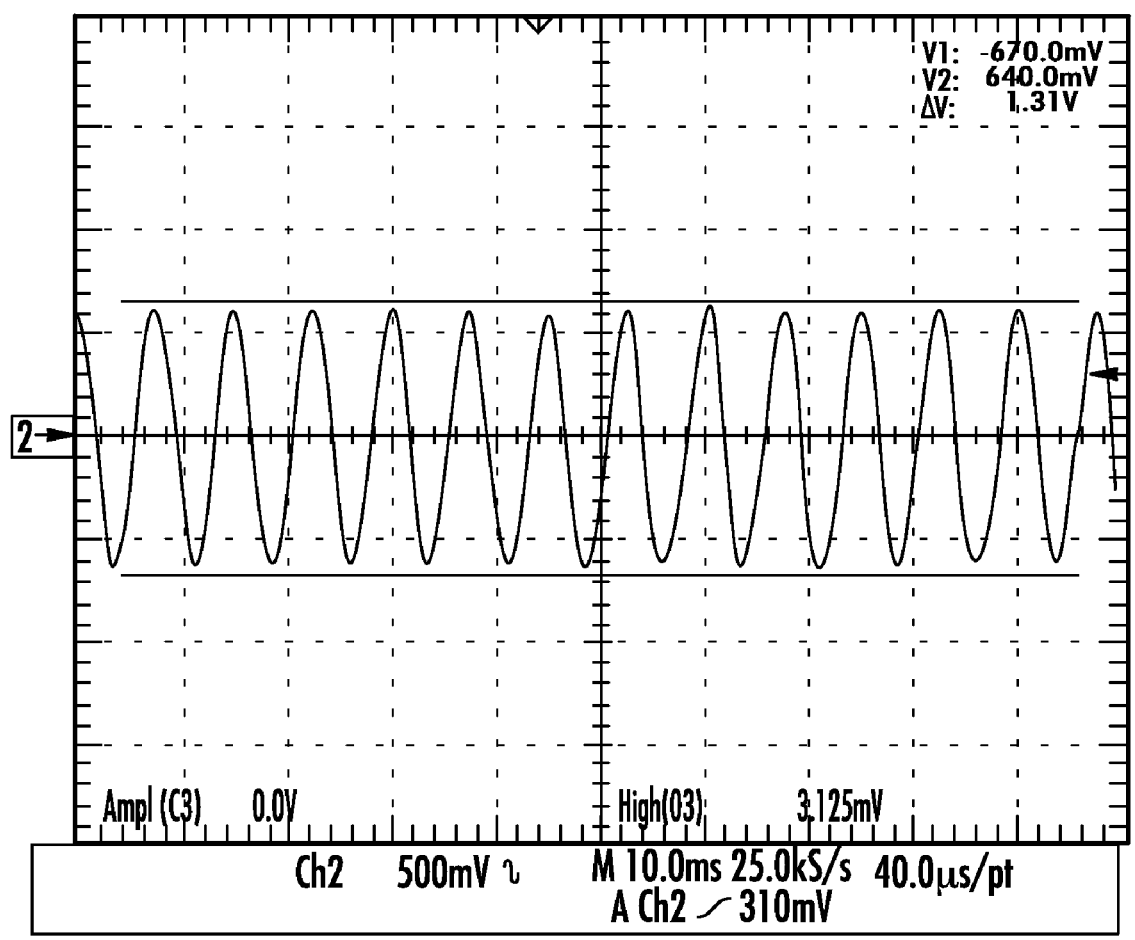
FIG. 5 is a sample graph of a phase current of a brushless motor controlled according to the method of this invention.
Figure 6:
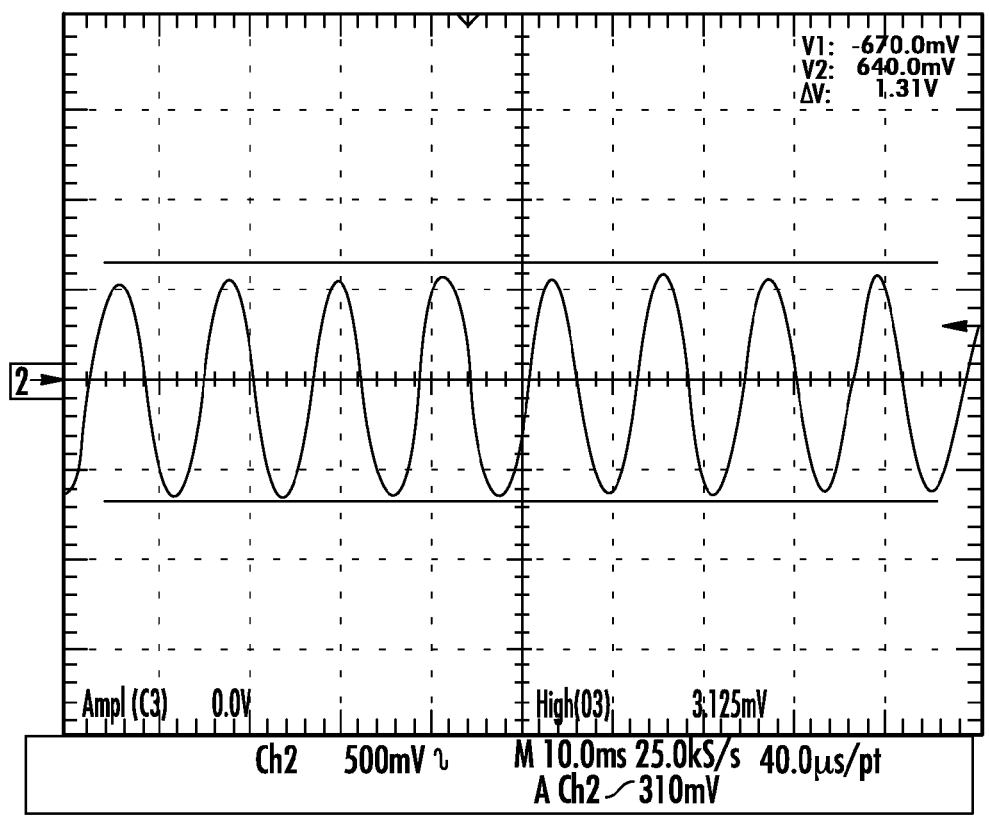
FIG. 6 is a sample graph of a phase current of a brushless motor controlled with a classic technique using an incremental encoder as in the prior art.

FIG. 5 depicts a graph of a phase current in the motor in the case in which the evaluation of the position of the rotor is carried out through three Hall sensors using the method. FIG. 6 depicts the graph of a phase current in the motor in the case in which the position of the rotor is evaluated by an incremental encoder.

The proposed method significantly reduces the deformation of the current profile reducing the THD and further makes the current profile symmetrical. The results, comparable with the results that are obtained using an incremental encoder (FIG. 6), demonstrate the effectiveness of the proposed method. Table 1 shows the theoretical angles corresponding to each edge of the Hall sensors for each of the two polar pairs of the system, and the effective angles evaluated with the proposed method, implemented on a microcontroller and transmitted to a personal computer through a serial port. The differences between the theoretical positions and the effective positions are relatively small.

TABLE 1

| | | |
|---|---|---|
| Table Offset[0] | 0 | 355.281 |
| Table Offset[1] | 60 | 48.9111 |
| Table Offset[2] | 120 | 115.763 |
| Table Offset[3] | 180 | 181.912 |
| Table Offset[4] | 240 | 243.666 |
| Table Offset[5] | 300 | 285.969 |
| Table Offset[6] | 0 | 0 |
| Table Offset[7] | 60 | 56.684 |
| Table Offset[8] | 120 | 117.867 |
| Table Offset[9] | 180 | 177.479 |
| Table Offset[10] | 240 | 239.518 |
| Table Offset[11] | 300 | 290.792 |

The method also allows estimation of the real angles of each of the Hall sensors by discriminating among the current polar pairs to have accurate estimations of the rotor position, and, thus, to drive the motor by reducing the THD of the phase currents of the motor. With this technique, the torque ripple of the motor is reduced even by using low resolution (and thus low cost) position sensors.

The invention claimed is:

1. A method for estimating an angular position in electrical degrees of a rotor of a brushless motor having position sensors spaced along a circumference of a stator, the position sensors generating digital signals that switch each time the rotor crosses certain angular positions, the method comprising:

storing for each position sensor the angular position of the rotor in electrical degrees at a switching of the digital signal generated by the position sensor and determining for each revolution of the rotor a time interval elapsed between a current switching edge and a preceding switching edge of the digital signal generated by a same position sensor confirming revolution of the rotor again through a same mechanical angular position; and estimating the angular position in electrical degrees during a current revolution of the rotor by identifying which of the position sensors has generated a last switching edge, by identifying a corresponding angular position in electrical degrees, and by identifying a time interval elapsed between two consecutive revolutions of the rotor through a same mechanical angular position, the angular position in electrical degrees corresponding to a sum between the angular position in electrical degrees and a product between a fraction of the time interval elapsed from the corresponding preceding switching edge multiplied by 360 degrees and by a number of polar pairs of the brushless motor.

2. A method for estimating an angular position of a rotor of a brushless motor having position sensors spaced along a circumference of a stator, the position sensors generating signals that switch each time the rotor crosses certain angular positions, the method comprising:

storing for each position sensor the angular position of the rotor at a switching thereof and determining for each revolution of the rotor a time interval elapsed between a current switching edge and a preceding switching edge by a same position sensor confirming revolution of the rotor again through a same mechanical angular position; and estimating the angular position during a current revolution of the rotor by identifying which of the position sensors has generated a last switching edge, by identifying a corresponding angular position, and by identifying a time interval elapsed between two consecutive revolutions of the rotor through a same mechanical angular position, the angular position corresponding to a sum between the angular position and a product between a fraction of the time interval elapsed from the corresponding precedent switching edge multiplied by 360 degrees and by a number of polar pairs of the brushless motor.

3. The method of claim 2, wherein the angular position is in electrical degrees.

4. A device for generating an estimation signal of an angular position in electrical degrees of a rotor of a brushless motor having position sensors spaced along a circumference of a stator, the position sensors generating digital signals that switch each time the rotor crosses certain angular positions, the device comprising:

a first circuit to sense and discriminate switching edges generated by each of the position sensors, and to generate an end-counting command at each detected edge, a first start pulse signal in correspondence with switching edges of a pre-selected sensor and a second pulse signal at each switching edge of any other sensor;

a second circuit to be input with the first start and second pulse signals to generate a digital signal of an identification index that identifies a last detected switching edge;

a third circuit to be input with the end-counting command, the digital signal of the identification index and an estimation signal of an instantaneous position in electrical degrees of the rotor, to generate a second digital signal representing a position in electrical degrees corresponding to the last detected switching edge; and a fourth circuit to be input with the second pulse signal, the digital signal of the identification index and the second digital signal, to generate the estimation signal of the instantaneous position by at least estimating the angular position in electrical degrees of the rotor of the motor, by at least storing for each position sensor the angular position of the rotor in electrical degrees at a switching of the digital signal generated by the position sensor and determining for each revolution of the rotor a time interval elapsed between a current switching edge and a preceding switching edge of the digital signal generated by a same position sensor confirming a passage of the rotor again through a same mechanical angular position, and estimating the angular position in electrical degrees during a current revolution of the rotor by identifying which of the position sensors has generated a last switching edge, by identifying a corresponding angular position in electrical degrees, and by identifying a time interval elapsed between two consecutive revolutions of the rotor through the same mechanical angular position, the angular position in electrical degrees corresponding to a sum between the angular position in electrical degrees and a product between a fraction of the time interval elapsed from a corresponding preceding switching edge multiplied by 360 degrees and by a number of polar pairs of the brushless motor.

5. The device of claim 4, wherein said third circuit comprises:

a sampling register of a sampled value represented by the estimation signal of the position at each occurrence of an active edge of the second pulse signal, to generate a digital signal representing the sampled value; and a logic storage circuit to be input with the identification index and the sampled value digital signal by said sampling register, to store the sampled value digital signal in a respective internal register identified by the identification index at each active edge of the second pulse signal, and to generate the second digital signal.

6. The device of claim 4, wherein said fourth circuit comprises:

a timer ($T_0$);

a second sampling register of a sampled counting of said timer at each active edge of the second pulse signal;

a second logic storage circuit to be input with the identification index digital signal and the sampled counting by said second sampling register, to store the counting in a respective internal register identified by the identification index at each active edge of the second pulse signal, and to generate a signal representing a counting of said timer in correspondence of a previous switching edge identified by the identification index;

a first adder to calculate a time interval elapsed between the last detected switching edge and the previous switching edge identified by the identification index as a difference between the sampled counting and a previous counting value of the counting of said timer;

a second adder to calculate a time elapsed by the last detected switching edge as a difference between the counting of said timer and the sampled counting, and a logic circuit coupled to said first and second adders and to said logic storage circuit, to calculate a product between a fraction of the time interval, elapsed between the last detected edge and an immediately preceding edge, multiplied by 360 degrees and by the number of polar pairs of the motor, and to generate the estimation signal of the angular position in digital degrees corresponding to a sum of the product and the second digital signal.

7. A device for estimating an angular position of a rotor of a brushless motor having position sensors spaced along a circumference of a stator, the position sensors generating signals that switch each time the rotor crosses certain angular positions, the device comprising:

a first circuit to store, for each position sensor, the angular position of the rotor of a brushless motor at a switching thereof and determining for each revolution of the rotor a time interval elapsed between a current switching edge and a preceding switching edge by a same position sensor confirming revolution of the rotor again through a same mechanical angular position; and a second circuit coupled to said first circuit to estimate the angular position during a current revolution of the rotor by identifying which of the position sensors has generated a last switching edge, by identifying a corresponding angular position, and by identifying a time interval elapsed between two consecutive revolutions of the rotor through a same mechanical angular position, the angular position corresponding to a sum between the angular position and a product between a fraction of the time interval elapsed from the corresponding preceding switching edge multiplied by 360 degrees and by a number of polar pairs of the brushless motor.

8. A non-transitory computer readable medium comprising:

software code for estimating an angular position of a rotor of a brushless motor having position sensors spaced along a circumference of a stator, the position sensors generating signals that switch each time the rotor crosses certain angular positions by at least storing for each position sensor the angular position of the rotor at a switching thereof and determining for each revolution of the rotor a time interval elapsed between a current switching edge and a preceding switching edge by a same position sensor confirming revolution of the rotor again through a same mechanical angular position, and estimating the angular position during a current revolution of the rotor by identifying which of the position sensors has generated a last switching edge, by identifying a corresponding angular position, and by identifying a time interval elapsed between two consecutive revolutions of the rotor through a same mechanical angular position, the angular position corresponding to a sum between the angular position and a product between a fraction of the time interval elapsed from the corresponding preceding switching edge multiplied by 360 degrees and by a number of polar pairs of the brushless motor.

9. The non-transitory computer readable medium of claim 8, wherein the angular position is in electrical degrees.

* * * * *